United States Patent
Obot (10) Patent No.: US 12,503,636 B2
(45) Date of Patent: Dec. 23, 2025

(54) CORROSION INHIBITOR COMPOSITION FOR WET SOUR CRUDE

(71) Applicant: KING FAHD UNIVERSITY OF PETROLEUM AND MINERALS, Dhahran (SA)

(72) Inventor: Ime Bassey Obot, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 513 days.

(21) Appl. No.: 18/179,827

(22) Filed: Mar. 7, 2023

(65) Prior Publication Data

US 2024/0301275 A1 Sep. 12, 2024

(51) Int. Cl.
  *C09K 8/54* (2006.01)
  *C23F 11/00* (2006.01)
  *C23F 11/10* (2006.01)
  *C23F 11/14* (2006.01)

(52) U.S. Cl.
  CPC .............. *C09K 8/54* (2013.01); *C23F 11/00* (2013.01); *C23F 11/146* (2013.01); *C23F 11/149* (2013.01); *C09K 2208/32* (2013.01)

(58) Field of Classification Search
  None
  See application file for complete search history.

(56) References Cited

U.S. PATENT DOCUMENTS

| 11,124,882 B2 | 9/2021 | Obot et al. |
| 2017/0200619 A1* | 7/2017 | Cooper ............. H01L 21/31111 |
| 2018/0334750 A1* | 11/2018 | Obot ........................ C09K 8/04 |
| 2019/0309424 A1* | 10/2019 | Obot .................... C23F 11/149 |

FOREIGN PATENT DOCUMENTS

| CN | 104388945 B | 10/2015 |
| EP | 2 678 630 A2 | 1/2014 |
| EP | 1 910 587 B1 | 8/2019 |
| WO | WO 2007/005163 A2 | 1/2007 |

OTHER PUBLICATIONS

CN 107083553 A (Year: 2017).*
CN 111730243 A (Year: 2020).*
Ikenna B. Onyeachu, et al., "Green corrosion inhibitor for oilfield application I: Electrochemical assessment of 2-(2-pyridyl) benzimidazole for API X60 steel under sweet environment in NACE brine ID196", Corrosion Science, vol. 150, Apr. 15, 2019, pp. 183-193 (Abstract only).
N Huynh, et al., "Inhibition of copper corrosion by coatings of alkyl esters of carboxybenzotriazole", Corrosion Science, vol. 44, Issue 11, Nov. 2002, pp. 2583-2596 (Abstract only).

* cited by examiner

*Primary Examiner* — Joseph D Anthony
(74) *Attorney, Agent, or Firm* — Oblon, McClelland, Maier & Neustadt, L.L.P.

(57) ABSTRACT

A method of inhibiting sour corrosion of a metal surface including contacting the metal surface and composition in a corrosive medium. The corrosive medium includes hydrogen sulfide. The composition includes an aliphatic alcohol comprising 1 to 6 carbons, a polysorbate, a glycol compound, and a substituted benzimidazole compound. The composition includes a weight ratio of the substituted benzimidazole compound to the polysorbate of 1 to 3.

19 Claims, 4 Drawing Sheets

CORROSION INHIBITOR COMPOSITION FOR WET SOUR CRUDE

STATEMENT OF ACKNOWLEDGEMENT

Support provided by King Fahd University of Petroleum and Minerals (KFUPM) under grant number POC20104 is gratefully acknowledged.

BACKGROUND

Technical Field

The present disclosure is directed to a corrosion-inhibiting composition, and particularly, to a method of inhibiting sour corrosion of a metal surface.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Corrosion of steel is a problem in oil and gas production and transportation systems and causes substantial economic loss. Ruptures and breakdowns caused by frequent pipe wall corrosion are followed by significant losses of products, environmental pollution, and ecological disasters. Most of the oil and gas pipeline failures result from $H_2S/CO_2$ corrosion of carbon and low alloy steels and occur at all stages of production, from downhole to surface equipment and processing facilities.

The presence of $H_2S$, $CO_2$, organic acids and brine solution in crude oil products creates a highly corrosive environment within the deep wells and oil pipeline infrastructure of the gas and oil industry. Two of the most significant types of corrosion are sweet ($CO_2$-induced) corrosion and sour ($H_2S$-induced) corrosion. Once dissolved in water, both $CO_2$ and $H_2S$ behave like weak acids and are able to oxidize steel. The more dominant of either sweet or sour corrosion in oilfield pipelines depends on the relative abundance of each gas present.

Sour environments provide more aggressive corrosion conditions for steel and predominantly occur under conditions with a large $H_2S:CO_2$ ratio. The conditions for sour corrosion may result from naturally occurring $H_2S$ in the producing formation or from surface contamination such as injection water. The chemistry for the cathodic reduction of $H_2S$ during sour corrosion is not definitively known. One proposed mechanism includes a solid state reaction between Fe and $H_2S$ to yield FeS and hydrogen gas ((1)-(4) below). The reaction is initiated by a two-step partial dissociation of $H_2S$ once it has been dissolved in water.

$$H_2S \leftrightarrow H^+ + HS^- \quad (1)$$

$$HS^- \leftrightarrow H^+ + S^{2-} \quad (2)$$

$$H_2S + 2e^- \leftrightarrow H_2(g) + S^{2-} \quad (3)$$

$$Fe^{2+} + S^{2-} \leftrightarrow FeS \quad (4)$$

Occlusion of hydrogen and sulfide ions within the steel matrix and FeS destabilize the protective corrosion product layer, prompting steel corrosion in the $H_2S$—$CO_2$—$H_2O$ system. These occur more prominently under high $H_2S$ concentration or in low pH environments.

One of the most practical and cost-effective approaches in mitigation of aqueous corrosion in the oil and gas industry is by using chemical agents called corrosion inhibitors. Such inhibitors absorb the metal surface by forming a film and reduce the corrosion rate against aggressive corrosive environments. Unfortunately, many of the corrosion inhibitors deployed for use in oilfield application are toxic and non-biodegradable. While several other inhibitors, including long chain amide derivatives, have less environmental risk and suitable efficiency, high production costs make them less viable for industrial applications. Several low-toxicity organic corrosion inhibitors, such as mercaptoacetic acid derivatives, have poor corrosion inhibition efficiency for use in oilfield environments. Historically, some of the most intensively utilized corrosion inhibitors are film formers based on nitrogen-containing compounds. Multiple classes of nitrogen-based compounds have been reported for use in film formers, including imidazolines, amines and quaternary ammonium salts, often in combination with other types of inhibitors, including alkoxylated phosphate esters, and intensifiers. Despite these findings, the need remains for a corrosion inhibitor that is environmentally benign, low-cost, and highly effective.

Accordingly, it is one object of the present disclosure to provide an improved, cost-effective corrosion inhibitor composition, that is effective in preventing the corrosion of metals found in the oil and gas industry, even when used in parts per million (ppm) levels.

SUMMARY

In an exemplary embodiment, a method of inhibiting sour corrosion of a metal surface is described. The method includes contacting the metal surface with a composition in the presence of a corrosive medium. The corrosive medium includes hydrogen sulfide. The composition includes an aliphatic alcohol including 1 to 6 carbons, a polysorbate, a glycol compound, and a substituted benzimidazole compound. The composition includes a weight ratio of the substituted benzimidazole compound to the polysorbate of 1 to 3.

In some embodiments, the substituted benzimidazole compound is at least one selected from the group consisting of 2-(2-pyridyl)benzimidazole, 2-(2-pyridyl)benzimidazole, 2-(4-methyl-2-pyridyl)-1H-benzimidazole, and 2-(4-ethyl-2-pyridinyl)-1H-benzimidazole.

In some embodiments, the polysorbate is selected from the group consisting of polysorbate 20, polysorbate 40, polysorbate 60, and polysorbate 80.

In some embodiments, the glycol compound is selected from the group consisting of ethylene glycol and propylene glycol.

In some embodiments, the aliphatic alcohol is selected from the group consisting of methanol, ethanol, n-propanol, 2-propanol, n-butanol, isobutyl alcohol, tert-butyl alcohol, and 2,2-dimethyl-1-propanol.

In some embodiments, the composition includes 1-10 wt. % of the substituted benzimidazole compound, 3-30 wt. % of the polysorbate, 35-50 wt. % of the glycol compound, and 35-45 wt. % of the aliphatic alcohol, based on the total weight of the composition.

In some embodiments, the composition does not include a quaternary ammonium salt, a mercaptocarboxylic acid, a 2-thioxodihydropyrimidine-dione, a sulfhydryl alcohol, glutathione, or a metal iodide.

In some embodiments, the metal surface is made from at least one material selected from the group consisting of carbon steel, stainless steel, iron, copper, nickel, and alloys thereof.

In some embodiments, the metal surface is carbon steel. The carbon steel includes 0.05-0.5 wt. % C, 0.5-2 wt. % Mn, 0.001 to 0.01 wt. % S, 0.005-0.05 wt. % P, 0.05-0.5 wt. % Cu, 0.01-0.05 wt. % Si, 0.01-0.1 wt. % Cr, 0.005-0.05 wt. % Mo, 0.01-0.1 wt. % Ni, 0.01-0.1 wt. % Cr and Fe as a balance.

In some embodiments, the corrosive medium further includes at least one salt selected from the group consisting of an alkali metal salt, an alkaline earth metal salt, and hydrates thereof.

In some embodiments, the corrosive medium further includes 1-10 wt. % NaCl, 0.1-1 wt. % $CaCl_2$, and 0.01-1 wt. % $MgCl_2$, based on the total mass of the corrosive medium.

In some embodiments, the corrosive medium further includes carbon dioxide.

In some embodiments, the composition has a concentration of 25-200 parts per million (ppm) in the corrosive medium.

In some embodiments, the composition has a concentration of 75-125 ppm in the corrosive medium.

In some embodiments, the metal surface is at least partially coated with at least one layer of the composition prior to the contacting of the metal surface and the composition in the corrosive medium.

In some embodiments, the corrosive medium has a temperature of 30-70° C.

In some embodiments, the metal surface has a corrosion rate of less than 10 mils per year (mpy) in the corrosive medium.

In some embodiments, the metal surface has the corrosion rate of less than 6 mpy in the corrosive medium.

In some embodiments, the contacting of the metal surface and the composition in the corrosive medium is for at least 24 hours.

In some embodiments, the metal surface is part of a system for oil or gas production, transportation, or refining.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Where a numerical limit or range is stated herein, the endpoints are included. Also, all values and subranges within a numerical limit or range are specifically included as if explicitly written out.

As used herein, "parts per million" or "ppm" refers to an expression of concentration by mass or weight. For example, 1 ppm of a corrosion inhibitor denotes a 1:1,000,000 weight ratio of corrosion inhibitor per total weight of fluid (e.g. liquids, gases or combinations thereof) contacting the metal surface. Alternatively, 1 ppm of a corrosion inhibitor denotes a 1:1,000,000 weight ratio of the corrosion inhibitor per total weight of fluid contained or carried within oil and gas infrastructure having the metal surface.

The phrase "substantially free", unless otherwise specified, describes a particular component being present in an amount of less than about 1 wt. %, preferably less than about 0.5 wt. %, more preferably less than about 0.1 wt. %, even more preferably less than about 0.05 wt. %, yet even more preferably 0 wt. %, relative to a total weight of the composition being discussed.

As used herein, the term "substituted" refers to at least one hydrogen atom that is replaced with a non-hydrogen group, provided that normal valencies are maintained and that the substitution results in a stable compound. When a substituent is noted as "optionally substituted", the substituents are selected from the exemplary group including, but not limited to, halo, hydroxy, alkoxy, oxo, alkanoyl, aryloxy, alkanoyloxy, thiol, alkylthio, arylthio, arylalkylthio, alkylthiono, arylthiono, aryalkylthiono, alkylsulfonyl, arylsulfonyl, arylalkylsulfonyl, nitro, cyano, carboxy, carbamyl (e.g. —CONH2), substituted carbamyl (e.g. —CONHalkyl, —CONHaryl, CONHarylalkyl or cases where there are two substituents on one nitrogen from alkyl, aryl, or alkylalkyl), alkoxycarbonyl, aryl, substituted aryl, guanidine, heterocyclyl (e.g. indolyl, imidazoyl, furyl, thienyl, thiazolyl, pyrrolidyl, pyridyl, pyrimidiyl, pyrrolidinyl, piperidinyl, morpholinyl, piperazinyl, homopiperazinyl and the like), substituted heterocyclyl and mixtures thereof and the like. The substituents may themselves be optionally substituted, and may be either unprotected, or protected as necessary, as known to those skilled in the art, for example, as taught in Greene, et al., "Protective Groups in Organic Synthesis", John Wiley and Sons, Second Edition, 1991, hereby incorporated by reference in its entirety.

As used herein, "corrosion" refers to the process which converts refined metals to their more stable oxide. It is the gradual loss of a material (usually metals) by chemical reaction with their environment. Commonly, this means electrochemical oxidation of metal in reaction with an oxidant such as oxygen. Rusting, the formation of iron oxides is a well-known example of electrochemical corrosion producing oxide(s) and/or salt(s) of the original metal. Corrosion degrades the useful properties of materials and structures including strength, appearance and permeability to liquids and gases. Many structural alloys corrode merely from exposure to moisture in air, but the process can be strongly affected by exposure to certain substances. Because corrosion is a diffusion-controlled process, it generally occurs on exposed surfaces.

As used herein, a "corrosion inhibitor" refers to a chemical compound or composition that when added to a material and/or contacted with a corrodible substrate, typically a metal or an alloy, decreases the corrosion rates of the material. Inhibitors often play an important role in the oil extraction and processing industries where they have always been considered to be the first line of defense against corrosion. Cathodic corrosion inhibitors prevent the occurrence of the cathodic reaction of the metal. These inhibitors have metal ions able to produce a cathodic reaction due to alkalinity, thus producing insoluble compounds that may precipitate selectively on cathodic sites. This may deposit over the metal a compact and adherent film that restricts the diffusion of reducible species in these areas. This may increase the impedance of the surface and the diffusion restriction of the reducible species, that is, the oxygen diffusion and electrons conductive in these areas. Anodic inhibitors (also referred to as passivation inhibitors) act by reducing anodic reaction, blocking the anode reaction and supporting the natural reaction of passivation metal surface, they may also act by forming a film adsorbed on the metal. In general, the inhibitors react with the corrosion product, initially formed, resulting in a cohesive and insoluble film on the metal surface.

Aspects of the present invention are directed toward inhibiting sour corrosion of a metal surface. The present disclosure provides a corrosion inhibitor composition, also referred to as the composition, including a mixture of an aliphatic alcohol, a polysorbate, a glycol compound, and a substituted benzimidazole compound. The composition is effective in preventing/reducing the corrosion of metals in contact with wet sour crude.

Corrosion Inhibitor Composition

In some embodiments, the composition includes a solvent or a mixture of solvents. The solvent may be polar, nonpolar, aprotic, or protic. In some embodiments, exemplary solvents include, but are not limited to, water, methanol, ethanol, n-propanol, isopropanol, n-butanol, isobutanol, tert-butanol, ethyl acetate and other lower alkanols, glycerine, acetone, dichloromethane (DCM), dimethyl sulfoxide (DMSO), dimethyl acetate (DMA), dimethylformamide (DMF), isopropyl ether, acetonitrile, toluene, N-methylpyrrolidone (NMP), tetrahydrofuran (THF), tetrahydropyran, other cyclic mono-, di- and tri-ethers, polyalkylene glycols (e.g. polyethylene glycol, polypropylene glycol, propylene glycol), and mixtures thereof in suitable proportions. In one embodiment, the solvent of the corrosion inhibitor composition disclosed herein is miscible with water. Exemplary water-miscible solvents include, but are not limited to, acetone, acetonitrile, methanol, ethanol, 1-propanol, isopropanol, t-butyl alcohol, 1,3-propanediol, 1,5-pentanediol, 1,2-butanediol, 1,3-butanediol, 1,4-butanediol, dimethylformamide (DMF), diethanolamine, diethylenetriamine, methyl diethanolamine, dimethoxyethane, diethylene glycol dimethyl ether, 1,2-dimethoxy-ethane (DME), 1,4-dioxane, ethylene glycol, propylene glycol, glycerol, tetrahydrofuran, and dimethyl sulfoxide.

Figure 1A:
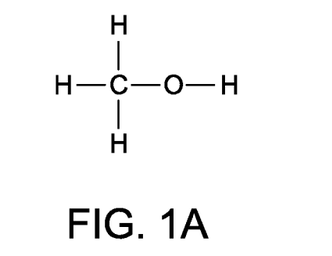
FIG. 1A depicts a schematic structure of methanol, according to certain embodiments.
Figure 1B:
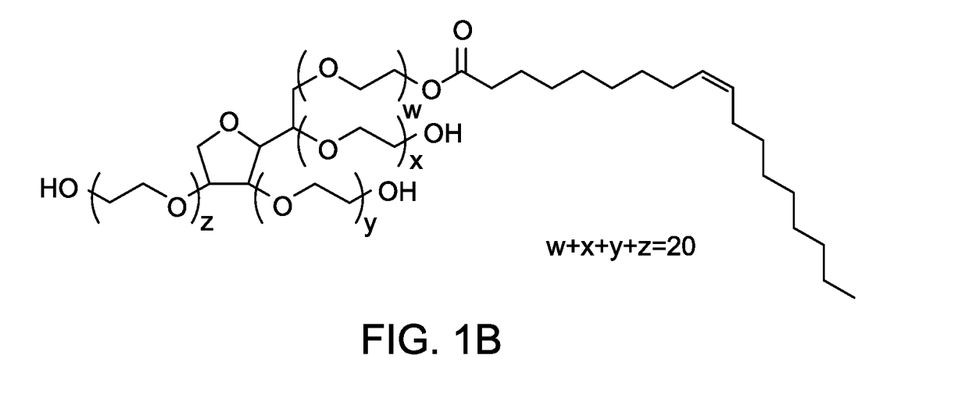
FIG. 1B depicts a schematic structure of tween-80®, according to certain embodiments.
Figure 1C:
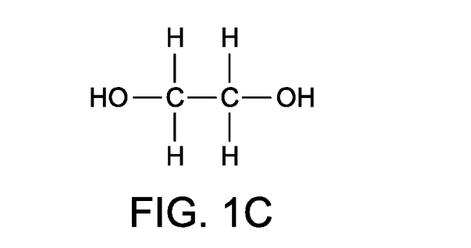
FIG. 1C depicts a schematic structure of glycol, according to certain embodiments.

In a preferred embodiment, at least one solvent is a glycol compound. Examples of glycol compounds include but are not limited to ethylene glycol, propylene glycol, 2-butoxyethanol, diethylene glycol butyl ether, polyethylene glycol, polypropylene glycol, and propylene glycol. In an embodiment, the glycol compound is ethylene glycol (as shown in FIG. 1C).

In a preferred embodiment, at least one solvent is an aliphatic alcohol. In some embodiments, the aliphatic alcohol has 1-10 carbon atoms, preferably 2-9, 3-8, 4-7 or 5-6 carbon atoms. The aliphatic alcohol is selected from the group consisting of methanol, ethanol, n-propanol, 2-propanol, n-butanol, isobutyl alcohol, tert-butyl alcohol, and 2,2-dimethyl-1-propanol. In a preferred embodiment, the aliphatic alcohol is methanol (as shown in FIG. 1A).

In a preferred embodiment, the solvent is a mixture of an aliphatic alcohol including 1 to 6 carbons, and a glycol compound. In some embodiments, an amount of the glycol compound is 50-55 wt. %, and an amount of the aliphatic alcohol is 45-50 wt. %. In some embodiments, the solvent includes an equal weight of the aliphatic alcohol and the glycol compound. In a preferred embodiment, the solvent includes more of the glycol compound than the aliphatic alcohol.

In some embodiments, the composition includes a surfactant. "Surfactant" is assigned its conventional meaning as a compound that lowers the surface tension (or interfacial tension) between two liquids or between a liquid and a solid and which can act as detergents, wetting agents, emulsifiers, foaming agents, and dispersants. In a preferred embodiment, the surfactant is a polysorbate. Polysorbate refers to a family of amphipathic, nonionic surfactants that are derived from ethoxylated sorbitan or isosorbide (a derivative of sorbitol) esterified with fatty acids. In some embodiments, the polysorbate is selected from the group consisting of polysorbate 20, polysorbate 40, polysorbate 60, and polysorbate 80. In a preferred embodiment, the polysorbate is polysorbate 80 or tween 80® (as shown in FIG. 1B).

In some preferred embodiments, the surfactant is not a quaternary ammonium compound. In a preferred embodiment, the composition is substantially free of quaternary ammonium compounds. Quaternary amine compounds include, but are not limited to, alkyl benzyl ammonium chloride, benzyl cocoalkyl (C12-C18) dimethylammonium chloride, dicocoalkyl (C12-C18) dimethylammonium chloride, ditallow dimethylammonium chloride, di(hydrogenated tallow alkyl)dimethyl quaternary ammonium methyl chloride, cetyl trimethyl ammonium bromide, methyl bis(2-hydroxyethyl cocoalkyl (C12-C18) quaternary ammonium chloride, dimethyl(2-ethyl) tallow ammonium methyl sulfate, n-dodecylbenzyldimethylammonium chloride, n-octadecylbenzyldimethyl ammonium chloride, n-dodecyltrimethylammonium sulfate, soya alkyltrimethylammonium chloride, and hydrogenated tallow alkyl (2-ethylhexyl) dimethyl quaternary ammonium methyl sulfate.

Figure 1D:
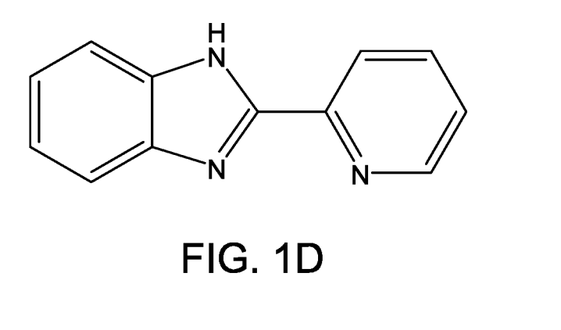
FIG. 1D depicts a schematic structure of 2-(2-pyridyl) benzimidazole, according to certain embodiments.

In some embodiments, the composition includes an azole compound. The term "azole" as used herein is given its conventional meaning of a five-membered heterocyclic compound containing a nitrogen atom and at least one other non-carbon atom. A substituted azole may contain a carboxylic, amide, aromatic carbonyl group, or other chemical substituents. Preferably, an azole for incorporation into a composition according to the invention will have the following benzimidazole core structure:

In some embodiments, a substituted benzimidazole component is substituted at one or more of carbons 1-5 of the above structure. It may be substituted with a straight or branched alkyl group of 1-6 carbons, an amide, an alkyl amino, a carboxyl, an ester, a hydroxyl or an optionally substituted aromatic group. In a preferred embodiment, the benzimidazole is substituted at only carbon 1. In a preferred embodiment, the benzimidazole is substituted at carbon 1 with an optionally substituted aromatic group. In a preferred embodiment, the aromatic group is selected from the group consisting of phenyl, pyridine, pyrrole, furan, imidazole, oxazole, pyrimidine. In some embodiments, the aromatic group is substituted with a straight or branched alkyl group of 1-6 carbons, an amide, an alkyl amino, a carboxyl, an ester, or a hydroxyl. In a preferred embodiment, the substituted benzimidazole compound is at least one selected from the group consisting of 2-(2-pyridyl)benzimidazole, 2-(2-pyridyl)benzimidazole, 2-(4-methyl-2-pyridyl)-1H-benzimidazole, and 2-(4-ethyl-2-pyridinyl)-1H-benzimidazole. In more preferred embodiment, the substituted benzimidazole compound is the 2-(2-pyridyl)benzimidazole (as shown in FIG. 1D). In a preferred embodiment, the substituted benzimidazole compound does not include sulfur.

The composition includes 1-10 wt. %, 3 to 10 wt. %, 4 to 6 wt. %, and yet more preferably 5 wt. % of the substituted benzimidazole compound; 3-30 wt. %, more preferably 10 to 20 wt. %, more preferably 12 to 17 wt. %, and yet more preferably 15 wt. % of the polysorbate; 35-50 wt. %, more preferably 38 to 45 wt. %, more preferably 40 to 43 wt. %, and yet more preferably 42 wt. % of the glycol compound; and 35-45 wt. %, more preferably 36 to 42 wt. %, more preferably 37 to 40 wt. %, and yet more preferably 38 wt. % of the aliphatic alcohol, based on the total weight of the composition. In an embodiment, the composition includes a weight ratio of the substituted benzimidazole compound to the polysorbate of 1 to 1-5 or 1-5 to 1, preferably 1 to 2, 2 to 1, 1 to 1.5, or 1.5 to 1. In an especially preferred embodiment, the composition includes a weight ratio of the substituted benzimidazole compound to the polysorbate of approximately 1 to 3. In a preferred embodiment, the composition is substantially free of sulfur.

In a preferred embodiment, the composition does not include a metal halide. In a preferred embodiment, the composition is substantially free of metal halides. "Metal halides" describe compounds comprising a metal and a halide, such as fluorine, chlorine, bromine, iodine and astatine. "Metals" preferably include alkali metals such as lithium, sodium, potassium, or rubidium; or alkali earth metals such as beryllium, magnesium, calcium, strontium or barium. Metal halides may also contain metals such as transition metals, post-transition metals, lanthanides, or actinides. "Iodine salts" include LiI, NaI, KI and RuI as well as $MgI_2$ and its hydrates and CaN and its hydrates. In a preferred embodiment, the composition does not include a metal iodide.

In a preferred embodiment, the composition does not include a polypeptide. In a preferred embodiment, the composition is substantially free of polypeptides. "Polypeptide" has its conventional meaning as any of a group of natural or synthetic polymers made up of amino acids chemically linked. One example of this kind of polypeptide is glutathione or (2S)-2-Amino-4-{[(1R)-1-[(carboxymethyl)carbamoyl]-2-sulfanylethyl]carbamoyl}butanoic acid. Glutathione analogs are also not included in this composition. These include S-octylglutathione, S-methylglutathione, S-lactoylglutathione, S-hexylglutathione, glutathionesulfonic acid, glutathione reduced ethyl ester, L-glutathione oxidized disodium salt, L-Glutathione oxidized and their derivatives, as well as those described by Lucent, et al., Design and synthesis of glutathione analogues, and by Fahey, Glutathione analogs in prokaryotes, Biochim. Biophys Acta 1830 (2013) 3182-3198, both of which are incorporated by reference.

In a preferred embodiment, the composition does not include a mercaptocarboxylic acid. In a preferred embodiment, the composition is substantially free of mercaptocarboxylic acid. The mercaptocarboxylic acid may be any organic molecule having at least one thiol group and at least one carboxyl group attached to a backbone containing 2-18 carbons, 3-15 carbons, 4-12 carbons, 5-10 carbons, or 6-8 carbons. Exemplary mercaptocarboxylic acids include, but are not limited to, mercaptoacetic acid (or thioglycolic acid), thiolactic acid, mercaptopropionic acid, 2-mercaptoisobutyric acid, 2-methyl-3-sulfanylpropanoic acid, mercaptobutanoic acid (or 4-mercaptobutyric acid), 6-mercaptohexanoic acid, 5-fluoro-2-mercaptobenzoic acid, 3-mercaptobenzoic acid, 4-mercaptobenzoic acid, thiosalicylic acid, (3-mercapto-5-propyl-4H-1,2,4-triazol-4-yl)acetic acid, 4-(5-sulfanyl-1H-tetraazol-1-yl)benzoic acid, 4-(mercaptomethyl)benzoic acid, 8-mercaptooctanoic acid, 11-mercaptoundecanoic acid, 12-mercaptododecanoic acid, 16-mercaptohexadecanoic acid, 2-sulfanyl-1H-benzimidazole-6-carboxylic acid, 2-sulfanyl-1H-benzimidazole-5-carboxylic acid, mercaptosuccinic acid, and 2,3-dimercaptosuccinic acid.

In a preferred embodiment, the composition does not include a 2-thioxodihydropyrimidine-dione. In a preferred embodiment, the composition is substantially free of 2-thioxodihydropyrimidine-dione. Exemplary 2-thioxodihydropyrimidine-diones include, but are not limited to, 2-thiobarbituric acid, 1,3-dimethyl-2-thiobarbituric acid, 1,3-diethyl-2-thiobarbituric acid, 5-(N-phenylcarbamoyl)-2-thiobarbituric acid, 5-ethyl-5-(1-methylbutyl)-2-thiobarbituric acid, 5-allyl-5-(1-methylbutyl)-2-thiobarbituric acid, 5-benzylidene-2-thiobarbituric acid, 5-(3-pyridylmethylene)-2-thiobarbituric acid, 5-picolinylidene-2-thiobarbituric acid, 5-vanillylidene-2-thiobarbituric acid, 5-(O-vanillylidene)-2-thiobarbituric acid, 5-ethyl-2-thiobarbituric acid, 5-butyl-2-thiobarbituric acid, 5-furfurylidene-2-thiobarbituric acid, 5-piperonylidene-2-thiobarbituric acid, 5-(2-hydroxyethyl) 5-isopentyl-2-thiobarbituric acid, 5-(4-(dimethylamino)benzylidene)-2-thiobarbituric acid, and 5-ethyl-5-(2-methylallyl)-2-thiobarbituric acid.

In a preferred embodiment, the composition does not include a sulfhydryl alcohol. In a preferred embodiment, the composition is substantially free of sulfhydryl alcohol. The sulfhydryl alcohol may be any organic molecule having at least one thiol group and at least one hydroxy group attached to a backbone containing 2-15 carbons, 2-12 carbons, 3-10 carbons, or 4-8 carbons. Exemplary sulfhydryl alcohols include, but are not limited to, 5-mercapto-4H-[1,2,4]triazol-3-ol, 2-mercaptoethanol, 3-mercapto-1-propanol, 1-mercapto-2-propanol, 2,3-dimercapto-1-propanol, 2-mercapto-3-butanol, 3-methyl-3-sulfanyl-1-butanol, 4-ethyl-5-mercapto-4H-1,2,4-triazol-3-ol, 2-mercaptophenol, 3-mercaptophenol, 4-mercaptophenol, 3-mercapto-1-hexanol, 4-mercapto-4-methylpentan-2-ol, 6-mercapto-1-hexanol, 5-fluoro-2-mercaptobenzyl alcohol, 2-mercaptobenzyl alcohol, 8-mercapto-1-octanol, 9-mercapto-1-nonanol.

In a preferred embodiment, the composition does not include a gelatin. In a preferred embodiment, the composition is substantially free of gelatin. Gelatin (or gelatine) is a mixture of proteins and peptides which is produced by the partial hydrolysis (breakdown) of collagen extracted from the skin, bones, and/or connective tissues of animals such as domesticated cattle, chicken, pigs, and marine sources, in particular, bovine bones and hide, porcine skin, fish skin/scales, or fish offal. In a preferred embodiment, the composition does not include Type A gelatin or Type B gelatin.

In a preferred embodiment, the composition does not include an alkanolamine. In a preferred embodiment, the composition is substantially free of alkanolamine. Examples of alkanolamines are, ethanolamine, N-methyl ethanolamine, diethanolamine, N-methyl diethanolamine, N,N-dimethyl ethanolamine, N,N-diethyl ethanolamine, triethanolamine, 2-amino-1-propanol, 3-amino-1-propanol, 3-amino-2-propanol, diglycolamine, 2-amino-2-methyl-1-propanol (also known as aminomethyl propanol), 2-piperidineethanol, prolinol, and valinol.

In a preferred embodiment, the composition does not include a polyamine. In a preferred embodiment, the composition is substantially free of polyamine.

In a preferred embodiment, the composition does not include a thioglycol. In a preferred embodiment, the composition is substantially free of thioglycol. Examples of thioglycols are 2-mercaptoethanol, 2-(methylthio)ethanol, 2-(ethylthio)ethanol, thioglycol ethoxylate, thioglycol propoxylate, thioglycol butoxylate, thiodiglycol ethoxylate, thiodiglycol propoxylate, thiodiglycol butoxylate.

In a preferred embodiment, the composition does not include a cinnamaldehyde compound. In a preferred embodiment, the composition is substantially free of the cinnamaldehyde compound.

Metal Surface

Aspects of the present invention are directed toward a method of inhibiting sour corrosion of a metal surface. The method includes contacting the metal surface with a composition in the presence of a corrosive medium. In some embodiments, the metal surface is part of a system. As used herein, "systems" include, but are not limited to, systems used in petroleum (e.g., crude oil and its products) or natural gas production, such as well casing, transport pipelines, drilling and other oil field applications, transport, separation, refining, storage, and other liquid natural gas and petroleum-related applications, geothermal wells, water wells; cooling water systems including open recirculating, closed, and once-through systems; cisterns and water collection or holding systems, solar water heating systems, boilers and boiler water systems or systems used in power generation, mineral process waters including mineral washing, flotation and benefaction; paper mill digesters, washers, bleach plants, white water systems and mill water systems; black liquor evaporators in the pulp industry; gas scrubbers and air washers; continuous casting processes in the metallurgical industry; air conditioning and refrigeration systems; building fire protection heating water, such as pasteurization water; water reclamation and purification systems; membrane filtration water systems; food processing streams and waste treatment systems as well as in clarifiers, liquid-solid applications, municipal sewage treatment systems; and industrial or municipal water distribution systems. In preferred embodiments, the metal surface is part of a system for oil or gas production, transportation, or refining.

The metal surface is made from at least one material selected from carbon steel, stainless steel, iron, copper, nickel, and alloys thereof. As used herein, the term 'alloy' refers to the mixture of two or more elements in which the main component is usually a metal. The alloy may include but are not limited to aluminum, titanium, and magnesium alloys. The metal may exhibit a crystal structure such as a body-centered cubic (bcc), face-centered cubic (fcc), and hexagonal close-packed (hcp) structure.

Steel is an alloy of iron and carbon that is widely used in construction and other applications because of its high tensile strength and low cost. Carbon, other elements, and inclusions within iron act as hardening agents that prevent the movement of dislocations that naturally exist in the iron atom crystal lattices. The carbon in typical steel alloys may contribute up to 2.1% of its weight. Steels can be broadly categorized into four groups based on their chemical compositions: carbon steels, alloy steels, stainless steels, and tool steels. Carbon steels contain trace amounts of alloying elements and account for 90% of total steel production. Carbon steels can be further categorized intro three groups depending on their carbon content: low carbon steels/mild steels contain up to 0.3% carbon, medium carbon steels contain 0.3-0.6% carbon, and high carbon steels contain more than 0.6% carbon. Alloys steels contain alloying elements (e.g. manganese, silicon, nickel, titanium, copper, chromium and aluminum) in varying proportions in order to manipulate the steel's properties, such as its hardenability, corrosion resistance, strength, formability, weldability or ductility. Stainless steels generally contain between 10-20% chromium as the main alloying element and are valued for high corrosion resistance. With over 11% chromium, steel is about 200 times more resistant to corrosion than mild steel. These steels can be divided into three groups based on their crystalline structure: austenitic steels, ferritic steels and martensitic steels. Tool steels contain tungsten, molybdenum, cobalt and vanadium in varying quantities to increase heat resistance and durability, making them ideal for cutting and drilling equipment.

In one embodiment, the metallic substrate comprises steel, carbon steel, low carbon steel, mild steel, medium carbon steel, high carbon steel, alloy steel, stainless steel, austenitic steel, ferritic steel, martensitic steel, tool steel, or mixtures thereof. Preferably, the metallic substrate comprises carbon steel. Most preferably the metallic substrate is a carbon steel with a carbon content of 0.05-1.0%, for example, API 5L X grade steel such as X52, X56, X60, X65, X70 to X120, N-80, J55, P-110, T-95, C1018, QT 800, and HS80, and other steel alloys such as 13Cr, 25Cr, Inconel 825, and 316 L.

In some embodiments, the carbon steel includes 0.05-0.5 wt. %, more preferably 0.1 wt. % to 0.2 wt. %, and yet more preferably 0.18 wt. % C; 0.5-2 wt. %, more preferably 0.6 to 0.9 wt. %, and yet more preferably 0.8 wt. % Mn; 0.001 to 0.01 wt. %, more preferably 0.003 to 0.006 wt. %, and yet more preferably 0.004 wt. % S; 0.005-0.05 wt. %, more preferably 0.010 to 0.014 wt. %, and yet more preferably 0.012 wt. % P; 0.05-0.5 wt. %, more preferably 0.010 to 0.016 wt. %, and yet more preferably 0.014 wt. % Cu;

0.01-0.05 wt. %, more preferably 0.010 to 0.030 wt. %, and yet more preferably 0.028 wt. % Si; 0.01-0.1 wt. %, more preferably 0.04 to 0.08 wt. %, and yet more preferably 0.05 wt. % Cr; 0.005-0.05 wt. %, more preferably 0.008 to 0.012 wt. %, and yet more preferably 0.010 wt. % Mo; 0.01-0.1 wt. %, more preferably 0.02 to 0.06 wt. %, and yet more preferably 0.04 wt. % Ni; 0.01-0.1 wt. %, more preferably 0.04 to 0.08 wt. %, and yet more preferably 0.05 wt. % Cr; and Fe as a balance.

The method involves mixing the corrosion inhibitor composition in any of its embodiments with the corrosive medium in contact with the metal surface. Alternatively, the method may involve contacting and/or coating the metallic substrate with the corrosion inhibitor composition prior to immersion into a corrosive environment. Preferably, the corrosion inhibitor composition will be contacted with, or continuously or intermittently applied to, the surface of metal, preferably in a space or volume where continued contact between the metal surface and the corrosion inhibitor composition can be maintained or refreshed. In some embodiments, the metal surface is partially coated with at least one layer, preferably 1-10 layers of the composition before contacting the metal surface and the composition in the corrosive medium. In a preferred embodiment, the composition forms a continuous layer on the metal surface. In an embodiment, particles of the composition form a monolayer on the metal surface. In another embodiment, the particles of the composition may form more than a single layer on the metal surface.

Corrosive Medium

The method includes contacting the metal surface with a composition in the presence of a corrosive medium. As used herein, the term 'corrosive medium' refers to an environment that results in accelerated corrosion, such as acidic and high salt concentration environments.

In an embodiment, the corrosive medium includes brine. "Brine" includes NaCl salt water as well as water containing other salts such as KCl, NaCl, KBr, $CaBr_2CaCl_2$), $ZnBr$, $NaBr_2$, etc. A brine may be unsaturated or saturated with salt(s). In some embodiments, the corrosive medium includes 1-10 wt. %, preferably 2-4 wt. %, and yet more preferably 3.5 wt. % NaCl; 0.1-1 wt. % more preferably 0.2-0.4 wt. %, and yet more preferably 0.305 wt. % $CaCl_2$); and 0.01-1 wt. % more preferably 0.1-0.2 wt. %, and yet more preferably 0.186 wt. % $MgCl_2$, based on the total mass of the corrosive medium.

In one or more embodiments, the corrosive medium contains at least one inorganic acid, at least one inorganic salt, or both. Inorganic acids may be in liquid or gas forms and include acids such as HCl, $H_2SO_4$, $HNO_3$, $CO_2$, and $H_2S$. These inorganic acidic agents may be present in the corrosive medium at saturated concentrations, or at a concentration in a range of 1-2,000 ppm, 10-1,500 ppm, 100-1,000 ppm, 250-800 ppm, 400-700 ppm, or about 500 ppm.

In one or more embodiments, the corrosive medium contains at least one of $CO_2$, $H_2S$, and brine. In at least one embodiment, the corrosive medium contains both $CO_2$ and $H_2S$. In at least one embodiment, the corrosive medium contains $CO_2$, $H_2S$, and brine.

Preferably, for applications in the oil and gas industry, the corrosion inhibitor compositions of the present invention are stable at high temperatures. Oil and gas wells can reach temperatures higher than 120° C. (e.g. 130-140° C.). In one or more embodiments, the corrosive medium has a temperature in a range of 4-150° C., 10-120° C., 20-100° C., 30-80° C., 40-70° C., or 50-60° C.

Corrosion Inhibition

Corrosion rate is the speed at which metals undergo deterioration within a particular environment. The rate may depend on environmental conditions and the condition or type of metal. Factors often used to calculate or determine corrosion rate include, but are not limited to, weight loss (reduction in weight during reference time), area (initial surface area), time (length of reference time) and density. Corrosion rate is typically computed using mils per year (mpy). Mils penetration per year (mpy) is a unit of measurement equal to approximately one thousandth of an inch. The unit is typically applied in industries like manufacturing and engineering to measure coating thickness or tolerance. Mils penetration per year is commonly referred to as mil in the U.S. measurement system.

In one or more embodiments, the method disclosed herein involves introducing the corrosion inhibitor composition into the corrosive medium at a concentration of 25-200 ppm, 30-200 ppm, 40-150 ppm, 50-140 ppm, or 75-125 ppm. In a preferred embodiment, the corrosion inhibitor concentration is approximately 100 ppm. The contact of the metal surface and the composition in the corrosive medium is for at least 24 hours, preferably at least 72 hours, 1 week, 1 month or 1 year. Preferably the added corrosion composition maintains inhibition for at least 72 hours.

In one or more embodiments, the corrosion inhibitor composition of the present disclosure in any of its embodiments imparts a corrosion rate of less than 10 mpy in the corrosive medium, preferably 0.1-9 mpy, 0.5-8 mpy, 1-7 mpy, 2-6 mpy, 3-5 mpy, or approximately 4 mpy. In one embodiment, the corrosion rate of the metallic substrate is determined according to ASTM G59-97. In a preferred embodiment, the corrosion rate of the metallic substrate according to the presently disclosed method may be slowed by 5-100 mpy, preferably 10-80 mpy, 20-70 mpy, 30-60 mpy, or 40-50 mpy relative to the corrosion rate of a substantially identical metal surface exposed to a substantially identical corrosive medium lacking the corrosion inhibitor.

Corrosion inhibition efficiencies may be measured with the Tafel extrapolation, linear polarization resistance (LPR), potentiodynamic polarization (PDP), gravimetric or other similar methods. In a preferred embodiment, the method described herein in any of its embodiments achieves a corrosion inhibition efficiency in a range of 30-99.5%, 40-97%, 50-95%, 60-94%, 70-93%, 80-92%, or 85-90%. In one embodiment, the corrosion inhibition efficiency of the method disclosed herein is determined according to ASTM G102-89.

EXAMPLES

The following examples describe and demonstrate exemplary embodiments of the method described herein. The examples are provided solely for the purpose of illustration and are not to be construed as limitations of the present disclosure, as many variations thereof are possible without departing from the spirit and scope of the present disclosure.

Example 1: Materials Preparation

Carbon steel specimen (C1018) with elemental composition (wt. %) as follows: C (0.18), Mn (0.80), S (0.004), P (0.012), Cu (0.14), Si (0.028), Cr (0.05), Mo (0.010), Ni (0.04), Cr (0.05), Fe (balance) was used. Cylindrical C1018 specimens with a surface area of 5.23 square centimeters ($cm^2$) were used for electrochemical corrosion testing. Different grit sizes of silicon carbide papers, such as #320,

400, #600, #800, #1000, and #1200 grit, were used in grinding the coupons before corrosion tests. Ground coupons were washed thoroughly with distilled water, cleaned with acetone, dried in warm air, and placed inside an airtight desiccator before electrochemical experiments.

The corrosion inhibitor was prepared including 2-(2-pyridyl)benzimidazole, polysorbate 80 (also referred to as Tween® 80), ethylene glycol (also referred to as glycol), and methanol (FIGS. 1A-1D). This corrosion inhibitor is labeled throughout the Examples as POC. The amount of each component in the corrosion inhibitor was varied as shown in Table 1 to have different ratios of the 2-(2-pyridyl)benzimidazole to polysorbate 80.

TABLE 1

Composition of different ratios of corrosion inhibitor compositions in weight percent (wt. %).

| Composition Name | Ratios (A:B) | 2-(2-pyridyl) benzimidazole (A) | Polysorbate 80 (B) | Glycol | Methanol |
|---|---|---|---|---|---|
| POC 2 | 1:1.5 | 2.0 | 3.0 | 50.0 | 45.0 |
| POC 3 | 1:3 | 5.0 | 15.0 | 42.0 | 38.0 |
| POC 4 | 1:1.2 | 5.0 | 6.0 | 47.0 | 42.0 |

Example 2: Electrochemical Corrosion Testing Experiments

The Gamry 1010E potentiostat/galvanostat workstation (manufactured by Gamry Instruments, 734 Louis Dr, Warminster, PA 18974, USA) was used for the electrochemical experiment. Also, a five port K0047-1 L corrosion cell kit was used to comply with the American Society for Testings and Materials (ASTM) standards (manufactured by Amatek Scientific Instruments, 4903 W Sam Houston Pkwy N, Houston, TX 77041, USA).

Sour corrosion tests were conducted for active chemistries and the different corrosion inhibitor compositions. The sour corrosion test was carried out at a temperature of 60° C. in a 1-liter corrosion cell containing a synthetic NACE brine solution with a composition of 3.5 wt. % NaCl, 0.305 wt. % $CaCl_2 \cdot 2H_2O$, and 0.186 wt. % $MgCl_2 \cdot 6H_2O$. Sour-corrosive agent sodium thiosulphate ($Na_2S_2O_3$-0.001M) was added to the solution in a sealed corrosion cell to generate $H_2S$ inside a glass cell and simulate sour corrosion conditions. $CO_2$ gas was bubbled through the solution for the first two hours to de-aerate it and was continuously bubbled throughout the experiment. Furthermore, the solution was continuously stirred using a magnetic stirrer set at 500 rotations per minute (rpm) throughout the test. After 2 hours of purging, a test coupon was introduced into the corrosion cell, and open circuit potential (OCP) was monitored for 1 hour to ensure the stability of the potential with time.

Linear polarization resistance (LPR) measurements were also performed after achieving a stable OCP for an additional 1 hour (total of 2 hours) within ±20 mV/$E_{corr}$ using 0.167 millivolts per second (mV/s) as the scan rate. Finally, potentiodynamic polarization (PDP) curves were recorded in the potential range of −250 to +250 mV vs. saturated calomel electrode (SCE) using a 0.5 mV/s scan rate. The effect of concentration, temperature, and immersion time on the performance of the best corrosion inhibitor composition was conducted using the synthetic NACE brine.

Example 3: Corrosion Inhibitor Performance Calculations

LPR Measurements

LPR technique was utilized to determine the polarization resistance ($R_p$), which is inversely proportional to corrosion rate (CR) and corrosion current density ($i_{corr}$) as described by the Stern-Geary equation (1). The inhibition efficiency (n (%)) was obtained as follows:

$$\eta_{LPR} (\%) = \frac{R_p^{inh} - R_p}{R_p^{inh}} \times 100, \quad (1)$$

where $R_p$ is the polarization resistance without corrosion inhibitors, and $R_p^{inh}$ is the polarization resistance in the presence of corrosion inhibitors.

PDP Measurements

Kinetic parameters such as corrosion rates and inhibition efficiency were obtained using PDP techniques. The inhibition efficiency ($\eta_{PDP}$ (%)) was obtained by equation (2).

$$\eta_{PDP} (\%) = \frac{i_{corr} - i_{corr}^{inh}}{i_{corr}} \times 100 \quad (2)$$

where ($i_{corr}$) denotes the corrosion current density without inhibitor (blank) and $$(i_{corr}^{inh})$$

denotes the corrosion current density in the presence of a corrosion inhibitor.

Example 4: Effect of the Composition of the Corrosion Inhibitor

As shown in Table 1, the composition of the POC corrosion inhibitor was varied. LPR measurements were performed using the different compositions. Results are presented in Table 2. The results indicate that POC3 has the highest corrosion prevention and that unexpectedly, small variations in the amounts of each component and the ratio of 2-(2-pyridyl)benzimidazole to polysorbate 80 has a large effect on the corrosion inhibition properties. A ratio of the 2-(2-pyridyl)benzimidazole to polysorbate 80 of 1:3 in POC3 has the highest corrosion inhibition, and POC2 and POC4 have an mpy at least double that of POC3. POC3 was then chosen to be used in the following experiments.

TABLE 2

LPR measurements parameters for the C1018 carbon steel corrosion in the NACE brine saturated $CO_2/H_2S$ mixed solution without (blank) and with 100 ppm of the different corrosion inhibitor compositions at 60° C. after 2 hours of immersion.

| Composition Name | $E_{corr}$ (mV) vs. SCE | $i_{corr}$ ($\mu Acm^{-2}$) | Rp (Ohms $cm^{-2}$) | CR (mpy) | $\eta_{LPR}$ (%) |
|---|---|---|---|---|---|
| Blank | −719.1 | 322.1 | 80.9 | 147.2 | — |
| POC 2 | −643.3 | 27.1 | 963.1 | 12.4 | 91.6 |
| POC 3 | −625.7 | 12.4 | 2097.0 | 5.6 | 96.2 |
| POC 4 | −608.5 | 26.2 | 994.4 | 11.9 | 91.9 |

Example 5: Effect of Concentration of the Corrosion Inhibitor

To determine the effect of concentration of the POC3 composition, LPR and polarization measurements were conducted to determine the corrosion rates and inhibition efficiency of the C1018 carbon steel coupon in the NACE brine containing a mixture of simulated $CO_2/H_2S$ at 60° C. with and without different concentrations (25, 50, 100 and 200 ppm) of the POC3. Results are presented in Tables 3 and 4 for the LPR measurements and PDP measurements, respectively. The results indicate that the corrosion rate is concentration dependent, and the corrosion rate decreases up to 100 ppm. However, unexpectedly the corrosion rate begins to increase again with the addition of 200 ppm of the POC3. This indicates that an effective concentration of the POC3 is 100 ppm. At this concentration, the corrosion rate reduces from 185.6 mpy without the corrosion inhibitor (blank) to 1.4 mpy (Table 4). This corresponds to an inhibition efficiency of 99.2%.

Figure 2:
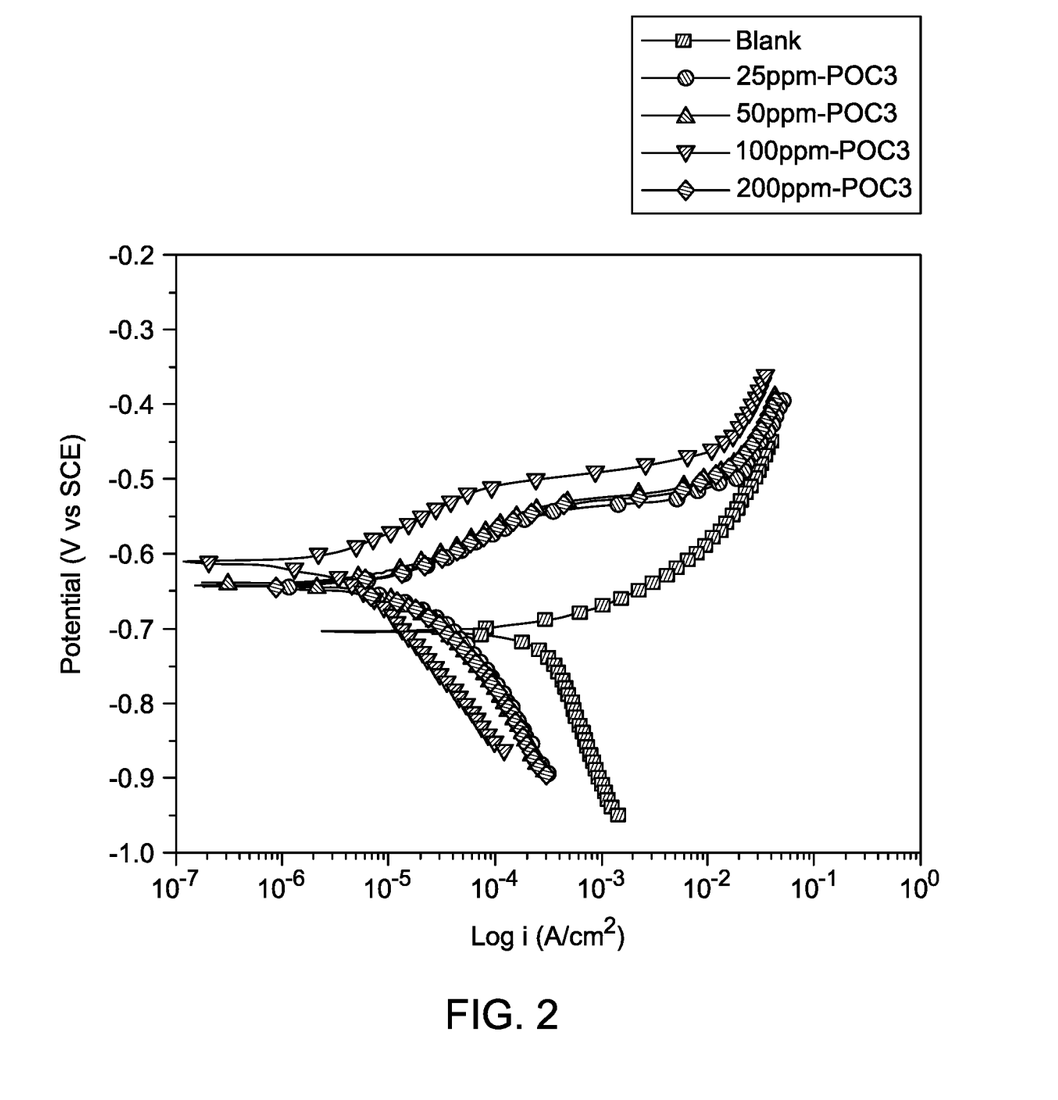
FIG. 2 depicts potentiodynamic polarization measurements (PDP) plots obtained for carbon steel corrosion in brine saturated with a $CO_2/H_2S$ mixed solution without a corrosion inhibitor (blank), and with different concentrations of the corrosion inhibitor (POC3) at 60° C. after 2 hours of immersion, according to certain embodiments.

FIG. 2 shows PDP plots obtained for the C1018 carbon steel corrosion in the NACE brine saturated $CO_2/H_2S$ mixed solution without (blank) and with different concentrations of the POC3 at 60° C. after 2 hours of immersion. The results indicate that the corrosion potentials were all shifted to the anodic region with the addition of the different concentrations of the POC3. The effect was more pronounced at 100 ppm. This shows the protection of the C1018 carbon steel in a sour environment at 100 ppm.

TABLE 3

LPR measurements parameters for the C1018 carbon steel corrosion in the NACE brine saturated $CO_2/H_2S$ mixed solution without (blank) and with different concentrations of the POC3 at 60° C. after 2 hours of immersion.

| Example | $E_{corr}$ (mV) vs. SCE | $i_{corr}$ ($\mu Acm^{-2}$) | Rp (Ohms $cm^{-2}$) | CR (mpy) | $\eta_{LPR}$ (%) |
|---|---|---|---|---|---|
| Blank (NACE brine) | −697.5 | 343.7 | 75.8 | 157 | — |
| 25 ppm | −643.3 | 17.7 | 1466 | 8.1 | 94.8 |
| 50 ppm | −639.2 | 14.8 | 1763 | 6.8 | 95.7 |
| 100 ppm | −632.8 | 13.9 | 1862 | 6.4 | 95.9 |
| 200 ppm | −643.4 | 16.2 | 1610 | 7.4 | 95.2 |

TABLE 4

PDP parameters for the C1018 carbon steel corrosion in the NACE brine saturated $CO_2/H_2S$ mixed solution without (blank) and with different concentrations of the POC3 at 60° C. after 2 hours of immersion.

| Example | $E_{corr}$ (mV) vs. SCE | $i_{corr}$ ($\mu Acm^{-2}$) | CR (mpy) | $\eta_{PDP}$ (%) |
|---|---|---|---|---|
| Blank (NACE brine) | −704 | 406 | 185.6 | — |
| 25 ppm | −643 | 16.4 | 7.5 | 96 |
| 50 ppm | −639 | 9.6 | 4.4 | 97.6 |
| 100 ppm | −612 | 3 | 1.4 | 99.2 |
| 200 ppm | −644 | 16 | 7.3 | 96.1 |

Example 6: Effect of Temperature on Corrosion Inhibition

The oil transportation pipelines are usually operated between 40-60° C., therefore the effect of temperature was studied. Tables 5 and 6 show the effect of temperature obtained for the C1018 carbon steel corrosion in the NACE brine saturated $CO_2/H_2S$ mixed solution without (blank) and with 100 ppm of the POC3 at 40 and 60° C. after 2 hours of immersion using LPR and PDP measurements, respectively. Tables 5 and 6 show that the corrosion rate was higher at 60° C. than at 40° C. However, the inhibition efficiency was more than 90% at both temperatures.

Figure 3:
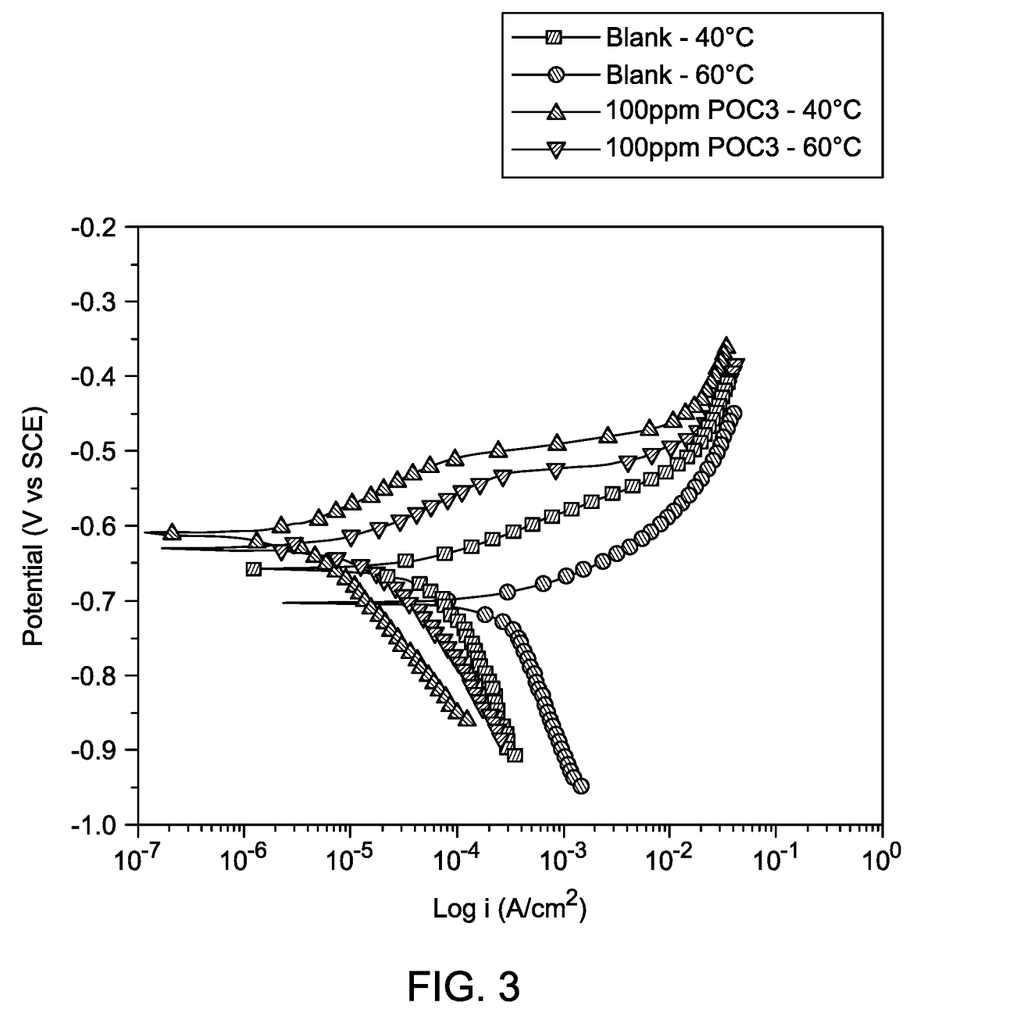
FIG. 3 depicts PDP plots obtained for the carbon steel corrosion in the brine saturated with a $CO_2/H_2S$ mixed solution without the corrosion inhibitor (blank) and with 100 ppm of the corrosion inhibitor (POC3) at 40 and 60° C. after 2 hours of immersion, according to certain embodiments.

FIG. 3 shows the PDP parameters obtained for the C1018 carbon steel corrosion in the NACE brine-saturated $CO_2/H_2S$ mixed solution without (blank) and with 100 ppm of the POC3 at 40 and 60° C. after 2 hours of immersion. FIG. 3 shows that an increase in temperature increases the corrosion current density. The introduction of the POC3 at 100 ppm was found to lead to a reduction in the corrosion current density. This effect was more pronounced at a lower temperature (40° C.). This indicates the ability of the POC3 to protect the C1018 carbon steel at both temperatures.

TABLE 5

LPR measurement parameters for the C1018 carbon steel corrosion in the NACE brine saturated $CO_2/H_2S$ mixed solution without (blank) and with 100 ppm of the POC3 at 40 and 60° C. after 2 hours immersion.

| Example | $E_{corr}$ (mV) vs. SCE | $i_{corr}$ ($\mu Acm^{-2}$) | Rp (Ohms $cm^{-2}$) | CR (mpy) | $\eta_{PDP}$ (%) |
|---|---|---|---|---|---|
| Blank-40° C. | −657.6 | 72.9 | 357 | 33.3 | — |
| POC3-40° C. | −611.2 | 4.6 | 5646 | 2.1 | 94.5 |
| Blank-60° C. | −697.5 | 343.7 | 75.8 | 157 | — |
| POC3-60° C. | −632.8 | 13.9 | 1862 | 6.4 | 95.9 |

TABLE 6

PDP parameters for the C1018 carbon steel corrosion in the NACE brine saturated $CO_2/H_2S$ mixed solution without (blank) and with 100 ppm of the POC3 at 40 and 60° C. after 2 hours of immersion.

| Example | $E_{corr}$ (mV) vs. SCE | $i_{corr}$ ($\mu Acm^{-2}$) | CR (mpy) | $\eta_{PDP}$ (%) |
|---|---|---|---|---|
| Blank-40° C. | −658 | 58.4 | 26.7 | — |
| POC3-40° C. | −612 | 3.1 | 1.4 | 94.7 |
| Blank-60° C. | −704 | 406 | 185.6 | — |
| POC3-60° C. | −630 | 8.8 | 4 | 97.8 |

Example 6: Effect of Immersion Time on Corrosion Inhibition

Figure 4:
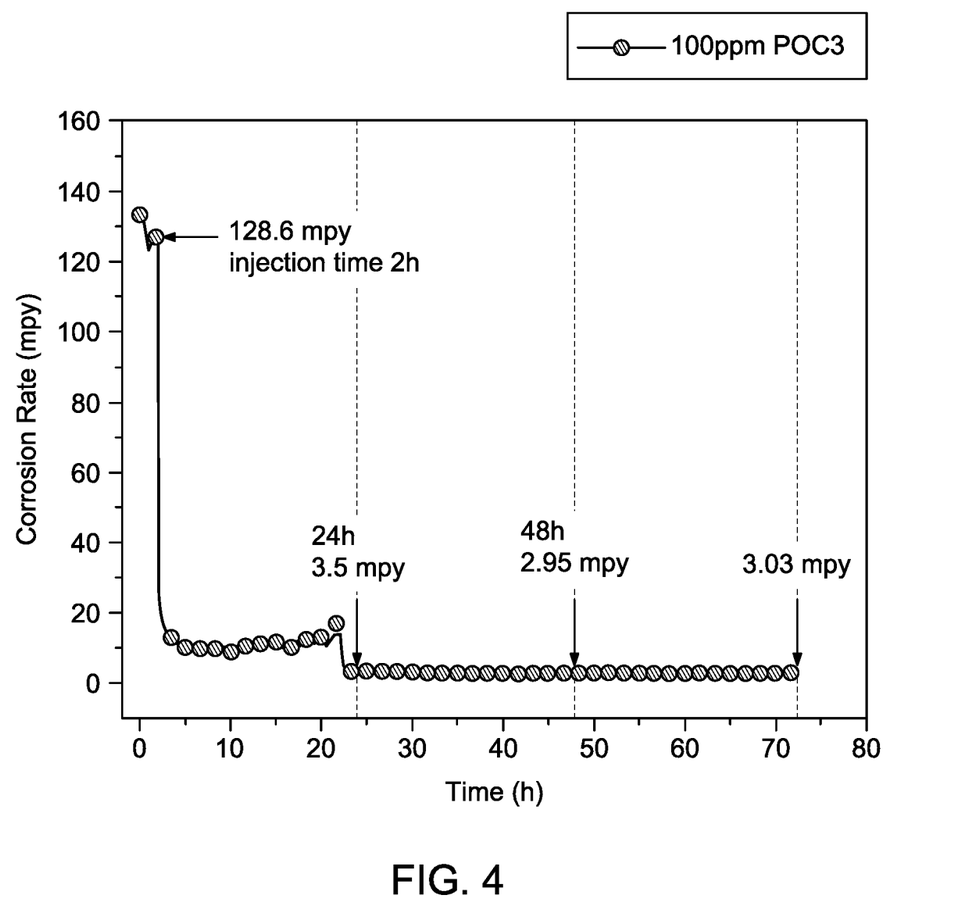
FIG. 4 depicts a linear polarization resistance measurements (LPR) vs. time plot obtained for the carbon steel corrosion in the brine with a saturated $CO_2/H_2S$ mixed solution with 100 ppm of the corrosion inhibitor at 60° C. from 2 hours pre-injection of the corrosion inhibitor up to 72 hours of immersion, according to certain embodiments.

LPR was used to investigate the long-term stability of the POC3 in protecting the C1018 carbon steel against sour corrosion. FIG. 4 shows LPR measurements vs. time plot obtained for the C1018 carbon steel corrosion in the NACE brine saturated $CO_2/H_2S$ mixed solution with 100 ppm of the POC3 at 60° C. from 2 hours pre-injection of the corrosion inhibitor up to 72 hours of immersion. In such tests, an uninhibited corrosion rate was 128.6 mpy after 2 hours of pre-corrosion of C1018 carbon. The corrosion inhibitor was added sequentially. First, after 2 hours, 50 ppm of the POC3 was added. This reduced the corrosion rate to 3.5 mpy. Next, 50 ppm more of the POC3 was added, and the experiment was conducted for 72 hours. This yielded corrosion rates of 2.95 mpy and 3.03 mpy at 48 h and 72 h, respectively.

The corrosion inhibitor composition forms a protective film on the metal surface. The composition can protect pipelines in oil well aqueous fluids containing sour wet crude and is particularly active at a very low dosage of 25 to 100 ppm, and varying temperatures. Moreover, the components required to fabricate the composition are readily available and cost-effective.

Numerous modifications and variations of the present disclosure are possible in light of the above teachings. It is therefore to be understood that within the scope of the appended claims, the invention may be practiced otherwise than as specifically described herein.

The invention claimed is:

1. A method of inhibiting sour corrosion of a metal surface, comprising:
    contacting the metal surface with a composition in the presence of a corrosive medium;
    wherein the corrosive medium comprises hydrogen sulfide;
    wherein the composition comprises:
    an aliphatic mono-alcohol comprising 1 to 6 carbons;
        a polysorbate;
        a glycol compound; and
        a substituted benzimidazole compound,
    wherein the composition comprises a weight ratio of the substituted benzimidazole compound to the polysorbate of 1 to 3,
    wherein the composition comprises 1-10 wt. % of the substituted benzimidazole compound, 3-30 wt. % of the polysorbate, 35-50 wt. % of the glycol compound, and 35-45 wt. % of the aliphatic mono-alcohol, based on the total weight of the composition.

2. The method of claim 1, wherein the substituted benzimidazole compound is at least one selected from the group consisting of 2-(2-pyridyl) benzimidazole, 2-(4-methyl-2-pyridyl)-1H-benzimidazole, and 2-(4-ethyl-2-pyridinyl)-1H-benzimidazole.

3. The method of claim 1, wherein the polysorbate is selected from the group consisting of polysorbate 20, polysorbate 40, polysorbate 60, and polysorbate 80.

4. The method of claim 1, wherein the glycol compound is selected from the group consisting of ethylene glycol and propylene glycol.

5. The method of claim 1, wherein the aliphatic mono-alcohol is selected from the group consisting of methanol, ethanol, n-propanol, 2-propanol, n-butanol, isobutyl alcohol, tert-butyl alcohol, and 2,2-dimethyl-1-propanol.

6. The method of claim 1, wherein the composition does not comprise a quaternary ammonium salt, a mercaptocarboxylic acid, a 2-thioxodihydropyrimidine-dione, a sulfhydryl alcohol, glutathione, or a metal iodide.

7. The method of claim 1, wherein the metal surface is made from at least one material selected from the group consisting of carbon steel, stainless steel, iron, copper, nickel, and alloys thereof.

8. The method of claim 1, wherein the metal surface is carbon steel, and wherein the carbon steel comprises:
    0.05-0.5 wt. % C;
    0.5-2 wt. % Mn;
    0.001 to 0.01 wt. % S;
    0.005-0.05 wt. % P;
    0.05-0.5 wt. % Cu;
    0.01-0.05 wt. % Si;
    0.01-0.1 wt. % Cr;
    0.005-0.05 wt. % Mo;
    0.01-0.1 wt. % Ni;
    0.01-0.1 wt. % Cr; and
    Fe as a balance.

9. The method of claim 1, wherein the corrosive medium further comprises at least one salt selected from the group consisting of an alkali metal salt, an alkaline earth metal salt, and hydrates thereof.

10. The method of claim 1, wherein the corrosive medium further comprises 1-10 wt. % NaCl, 0.1-1 wt. % $CaCl_2$, and 0.01-1 wt. % $MgCl_2$, based on the total mass of the corrosive medium.

11. The method of claim 1, wherein the corrosive medium further comprises carbon dioxide.

12. The method of claim 1, wherein the composition has a concentration of 25-200 parts per million (ppm) in the corrosive medium.

13. The method of claim 1, wherein the composition has a concentration of 75-125 ppm in the corrosive medium.

14. The method of claim 1, wherein the metal surface is at least partially coated with at least one layer of the composition prior to the contacting.

15. The method of claim 1, wherein the corrosive medium has a temperature of 30-70° C.

16. The method of claim 1, wherein the metal surface has a corrosion rate of less than 10 mils per year (mpy) in the corrosive medium.

17. The method of claim 1, wherein the metal surface has the corrosion rate of less than 6 mpy in the corrosive medium.

18. The method of claim 1, wherein the contacting is for at least 24 hours.

19. The method of claim 1, wherein the metal surface is part of a system for oil or gas production, transportation, or refining.

* * * * *